United States Patent
Mayer et al.

(10) Patent No.: US 8,967,643 B2
(45) Date of Patent: Mar. 3, 2015

(54) SPLIT ROLL STABILIZER

(75) Inventors: Ralf Mayer, Herzogenaurach (DE);
Manfred Kraus, Herzogenaurach (DE);
Bernd Wittmann, Pommersfelden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/877,062

(22) PCT Filed: Jul. 22, 2011

(86) PCT No.: PCT/EP2011/062593
§ 371 (c)(1),
(2), (4) Date: Jun. 14, 2013

(87) PCT Pub. No.: WO2012/041556
PCT Pub. Date: Apr. 5, 2012

(65) Prior Publication Data
US 2013/0270786 A1    Oct. 17, 2013

(30) Foreign Application Priority Data

Sep. 30, 2010 (DE) .......................... 10 2010 046 995
Jul. 7, 2011   (DE) .......................... 10 2011 078 819

(51) Int. Cl.
*B60G 17/016* (2006.01)
*B60G 17/019* (2006.01)
*B60G 21/055* (2006.01)
*B60G 21/10* (2006.01)

(52) U.S. Cl.
CPC .......... *B60G 21/106* (2013.01); *B60G 21/0553* (2013.01); *B60G 21/0555* (2013.01); *B60G 2400/98* (2013.01)

USPC ................................ 280/124.107; 280/5.506

(58) Field of Classification Search
CPC ............ B60G 17/0162; B60G 17/019; B60G 21/0555; B60G 2202/42; B60G 2202/442; B60G 2202/424; B60G 2206/427; B60G 2400/0511
USPC .............. 280/124.106, 124.107, 5.502, 5.506
See application file for complete search history.

(56) References Cited

U.S. PATENT DOCUMENTS

| | | | |
|---|---|---|---|
| 4,796,911 A | 1/1989 | Kuroki et al. | |
| 6,425,585 B1 * | 7/2002 | Schuelke et al. | 280/5.511 |
| 6,874,792 B2 | 4/2005 | Vortmeyer et al. | |
| 7,309,074 B2 * | 12/2007 | Taneda | 280/124.107 |
| 7,798,498 B2 * | 9/2010 | Buma | 280/5.511 |
| 7,832,739 B2 | 11/2010 | Pinkos et al. | |
| 7,837,202 B2 | 11/2010 | Taneda et al. | |
| 7,841,602 B2 * | 11/2010 | Simkovics | 280/5.511 |
| 7,887,071 B2 * | 2/2011 | Grieshaber et al. | 280/124.106 |
| 8,041,479 B2 * | 10/2011 | Buma | 701/37 |
| 2006/0116802 A1 * | 6/2006 | Yamada et al. | 701/37 |
| 2007/0119644 A1 * | 5/2007 | Yasui et al. | 180/183 |

(Continued)

FOREIGN PATENT DOCUMENTS

| | | |
|---|---|---|
| DE | 102006040109 | 2/2008 |
| DE | 102008001006 | 11/2009 |

(Continued)

*Primary Examiner* — Drew Brown
(74) *Attorney, Agent, or Firm* — Volpe and Koenig, P.C.

(57) ABSTRACT

Split roll stabilizer of a motor vehicle, between the two stabilizer parts (2a) of which an actuator (1) for a torsion of the stabilizer parts (2a) can be effectively disposed, a sensor (11) for determining the torsional moment acting in the stabilizer parts (2a) being provided.

6 Claims, 6 Drawing Sheets

(56) References Cited

U.S. PATENT DOCUMENTS

| | | |
|---|---|---|
| 2007/0247224 A1 | 10/2007 | May |
| 2007/0290473 A1* | 12/2007 | Buma ................... 280/124.106 |
| 2008/0100019 A1* | 5/2008 | Simkovics ............ 280/124.107 |
| 2008/0257070 A1 | 10/2008 | May |
| 2009/0152824 A1* | 6/2009 | Grieshaber et al. ........ 280/5.509 |
| 2011/0126639 A1 | 6/2011 | Behrens |
| 2013/0009374 A1* | 1/2013 | Wittmann et al. ..... 280/124.107 |

FOREIGN PATENT DOCUMENTS

| | | |
|---|---|---|
| DE | 102009028386 | 2/2011 |
| DE | 102010037555 | 3/2012 |
| WO | 2006013093 | 2/2006 |

* cited by examiner

SPLIT ROLL STABILIZER

BACKGROUND

The present invention relates to a split roll stabilizer. Split roll stabilizers are used for avoiding rolling movements of the vehicle body relative to the driving surface.

In active roll stabilizers, two stabilizer parts can be actively arranged between two stabilizer parts of the roll stabilizer. The actuator can apply a torsional moment on both stabilizer parts. The actuator can have, for example, a hydraulic or an electric drive. When the actuator is activated, the two stabilizer parts are rotated relative to each other and torsion is applied to them, so that a torsional moment is generated in the stabilizer parts. The stabilizer parts can be constructed as torsion bar springs.

Quick changes in the direction of travel tend to cause rolling movements in vehicle bodies. These rolling movements can be compensated by an active roll stabilizer.

So that the actuator can be used in a targeted manner, parameters such as a rolling movement of the vehicle body or a transverse acceleration of the vehicle are detected. With these parameters, the actuator can be activated in a targeted manner, in order to counteract rolling. For the targeted actuation of the actuator, a control device is typically used that allows, with the parameters on the input side, an activation of the actuator for a desired compensation of the rolling movement.

SUMMARY

The objective of the invention is to provide an alternative split roll stabilizer.

This object is met by the split roll stabilizer according to the invention. With the sensor provided according to the invention for determining the applied torsional moment in the stabilizer parts, the applied torsional moment can be used as a parameter. This allows a targeted actuation of the actuator that can be connected.

The actuator can be actively arranged between the two stabilizer parts, in order to introduce a generated torsional moment, on one side, into one stabilizer part and, on the other side, into the other stabilizer part.

Determining the active torsional moment is understood to be measuring the torsional moment acting in the stabilizer parts.

The sensor detects a change in the stabilizer part, which is the result of the effect of the torsional moment. This change can be a rotation of the stabilizer part.

In roll stabilizers according to the invention, the stabilizer parts can be constructed as torsion bar springs that are subjected to torsion and can rotate. The torque measurement can be measured in a known way, for example, with the help of strain gauges as sensors that are applied on the stabilizer part and detect a rotation of the stabilizer part. This rotation can also be measured indirectly, wherein different sensor types can be used, for example, Hall sensors.

Contactless measurement of the torque avoids direct contact of a sensor with the stabilizer part.

For contactless measurement of this torque, one refinement according to the invention has a known magnetostrictive measurement principle as is disclosed in the publication WO 2006/013093 A2.

This measurement principle detects a change in the magnetic property. NCTE's website has information that is reproduced below in excerpt and somewhat revised:

If a ferromagnetic crystal is magnetized, then increasing field strength causes a change in shape of the magnetized crystal that is called the magnetostrictive effect.

The most important part of magnetostriction is the Joule effect. It is based on the fact that the so-called magnetic domains rotate in the direction of magnetization and shift their boundaries. This changes the shape of the ferromagnetic body, wherein its volume remains constant. This effect is called the magnetostrictive effect because the change in volume of common magnetostrictive materials can be ignored in their effect.

This enables the permanent storage of an "enclosed" magnetic field structure in ferromagnetic materials. With the help of magnetically coded measurement shafts, mechanical forces can be measured and calculated in real time.

"Pulsed current magnetic encoding" designates a magnetic coding method. Here, several different signal frequencies with different pulsed current intensities are guided via a previously defined range of a shaft and in this way, "enclosed" magnetic field structures are programmed into the measurement shaft. This process must be performed only once, because the resulting structures are enclosed and thus form a stable state.

In contrast to other known methods for measuring forces, this magnetic coding method can be used to measure torques, bending forces, axial forces, radial forces, and shear forces in a contactless manner. Several physical parameters can be measured simultaneously at one and the same coded measurement point. In addition, the operating temperature range from −50° C. to +250° C. is guaranteed. The sensor is not sensitive to soiling, oil, water, or mechanical shocks, and provides very high measurement accuracy and output signal linearity of up to 0.05%. The signal bandwidth can equal up to 30 kHz and regular maintenance or recalibration of the sensor is not required.

The primary sensor can be a region of the shaft that is magnetically coded. It is sufficient to perform the coding process only once, advantageously before the shaft is installed in its provided installation location. The mechanical properties of the shaft are not affected by the coding process. The shaft should be made from ferromagnetic material. In general, industrial steel that contains between 1.5% and 8% Ni is a good basis for a primary sensor. The primary sensor converts the forces that are applied into a magnetic signal that can be detected on the surface of the shaft. The shaft can have a solid-shaft or hollow-shaft construction.

The secondary sensor is an arrangement of magnetic field sensors that are placed in the direct vicinity of the magnetically coded region of the shaft.

Because the secondary sensors do not contact the shaft, the shaft can rotate freely. The secondary sensor converts changes in the magnetic field—caused by forces in the primary sensor—into electrical information.

The secondary sensor module can be placed both outside and also inside the shaft, because the sensor signal can be detected on the outside and also on the inside.

The secondary sensor can be formed by very small coils, in order to measure the magnetic changes in the primary sensor under torsion with high resolution. The coils can be arranged in pairs, in order to enable common mode rejection through differential measurements and thus to compensate the effects of external magnetic fields. Common mode rejection mainly involves a perfect arrangement and good matching of the coils to each other.

For measuring torques, the secondary sensor can be arranged parallel to the axis of the shaft and symmetric to the center of the magnetically coded area—that is, of the primary sensor. The coils of the secondary sensor are normally arranged in pairs—the so-called coil pair. The coil pairs are distributed symmetrically around the periphery of the shaft according to their number. Through the use of more than one coil pair, radial tolerances of the shaft can be compensated.

The present invention has recognized that a sensor working according to this magnetostrictive principle—as described above, for example—is excellently suited for an active roll stabilizer.

In this refinement according to the invention, the sensor comprises the magnetically coded primary sensor and the secondary sensor that can convert changes in the magnetic properties of the primary sensor into an electrical signal.

The primary sensor can be formed, for example, by a shaft or by a sleeve that is magnetically coded. This coding can be realized in the way described above or also in other ways.

The secondary sensor can be constructed as a passive element and comprise a coil that detects magnetic changes in the primary sensor and can convert these changes into an electrical signal. This signal can be fed, for example, to a control device that is provided for actuation of the actuator. The secondary sensor can also be constructed as an active element.

The invention allows the sensors for controlling the actuator to be integrated directly into the torsion bar, in order to allow a construction as an autonomous system. This can take place parallel to the torsion bar or directly in the flow of forces or the load path of the torsion bar spring. In the case of the first alternative, the primary sensor transfers only a part of the applied rotational moment or torque; in the case of the second alternative, the primary sensor transmits the full applied rotational moment or torque.

The primary sensor can be formed by magnetically coded material. A magnetically coded primary sensor can be mounted on or in the torsion bar or connected to this bar. A secondary sensor that measures the direction of the field lines is placed above the primary sensor. If torsion is applied to the torsion bar springs, the slope of the field lines changes, wherein the change is measured by the secondary sensor.

The measurement of the change in slope—in the positive and negative load directions—can be the basis for a control of the actuator moment.

One embodiment provides for the direct integration of the primary sensor in the load path. In this case, the primary sensor transmits the full torsional moment of the roll stabilizer. For example, one part of the stabilizer part can be magnetically coded and form the primary sensor. In this way, the number of components for measuring the torsional moment is kept to a minimum.

The primary sensor can be adjusted parallel to the load path on the stabilizer part. In this case, the primary sensor merely transmits a small part of the torsional moment that can also be called the measurement torsional moment or the measurement torque. The stabilizer part itself transmits the largest portion of the torsional moment. Likewise, the diameter of the sleeve is increased, in order to achieve an improvement in the measurement results. The larger the diameter is, the larger is the rotational path measured in the peripheral direction. The rotational stiffness of the stabilizer part and the sleeve are in this case matched to each other, so that a torsion of the sleeve corresponds to a certain allocated, effective torque in the stabilizer part.

If the primary sensor is formed by a sleeve that is placed on the stabilizer part, the sleeve can be locked in rotation with its two axial ends each on one stabilizer part, wherein the sleeve is rotated or torqued when the roll stabilizer is loaded so that the secondary sensor can detect the applied torsional moment. The larger the axial distance of the two ends is relative to each other, the larger is the rotational angle and the more precise the measurement can be performed.

The magnetically coded primary sensor can be adjusted parallel to the load path between a flange and a stabilizer bearing. The flange can be mounted on the end of the stabilizer part that faces the actuator. The flange can be connected to the actuator, in order to transmit the torque. The stabilizer bearing supports the stabilizer part on the vehicle body and allows rotational movements of the stabilizer part about the torsion axis.

The mounting of the magnetically coded primary sensor on the stabilizer part can be realized with a friction fit connection by means of an interference fit, with a material fit connection, or with a positive fit connection. The primary sensor can be mounted by means of injection molding, bonding, or welding.

The length of the magnetically coded primary sensor between the flange and the support position can be extended to a maximum length, in order to produce the largest possible angle of rotation, so that the sensor resolution is improved.

The magnetically coded primary sensor can be adjusted parallel to the load path in the inner region of the tubular torsion bar spring.

BRIEF DESCRIPTION OF THE DRAWINGS

The invention is explained below in more detail with reference to six figures. Shown are.

DETAILED DESCRIPTION OF THE PREFERRED EMBODIMENTS

Figure 1:
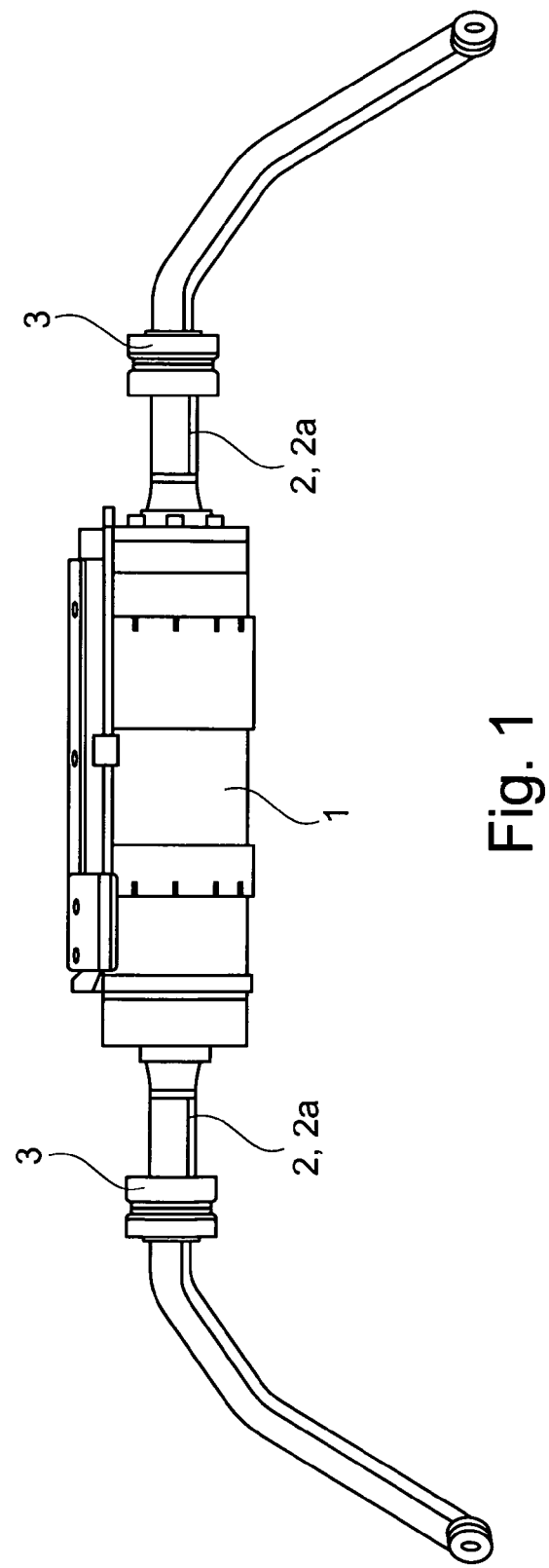
FIG. 1 is a split roll stabilizer according to the invention.

FIG. 1 shows a split roll stabilizer according to the invention with a connected actuator 1. The actuator 1 is actively arranged between two stabilizer parts 2a that are each formed as torsion bar springs 2. Both stabilizer parts 2a are supported so that they can each rotate by means of a stabilizer bearing 3 on a vehicle body that is not shown here. The actuator can have a motor with connected gears, wherein an actuator housing can be connected to one stabilizer part 2a and an output shaft can be connected to the other stabilizer part. When the actuator is activated, torsion is applied on the connected stabilizer parts 2a.

Figure 2:
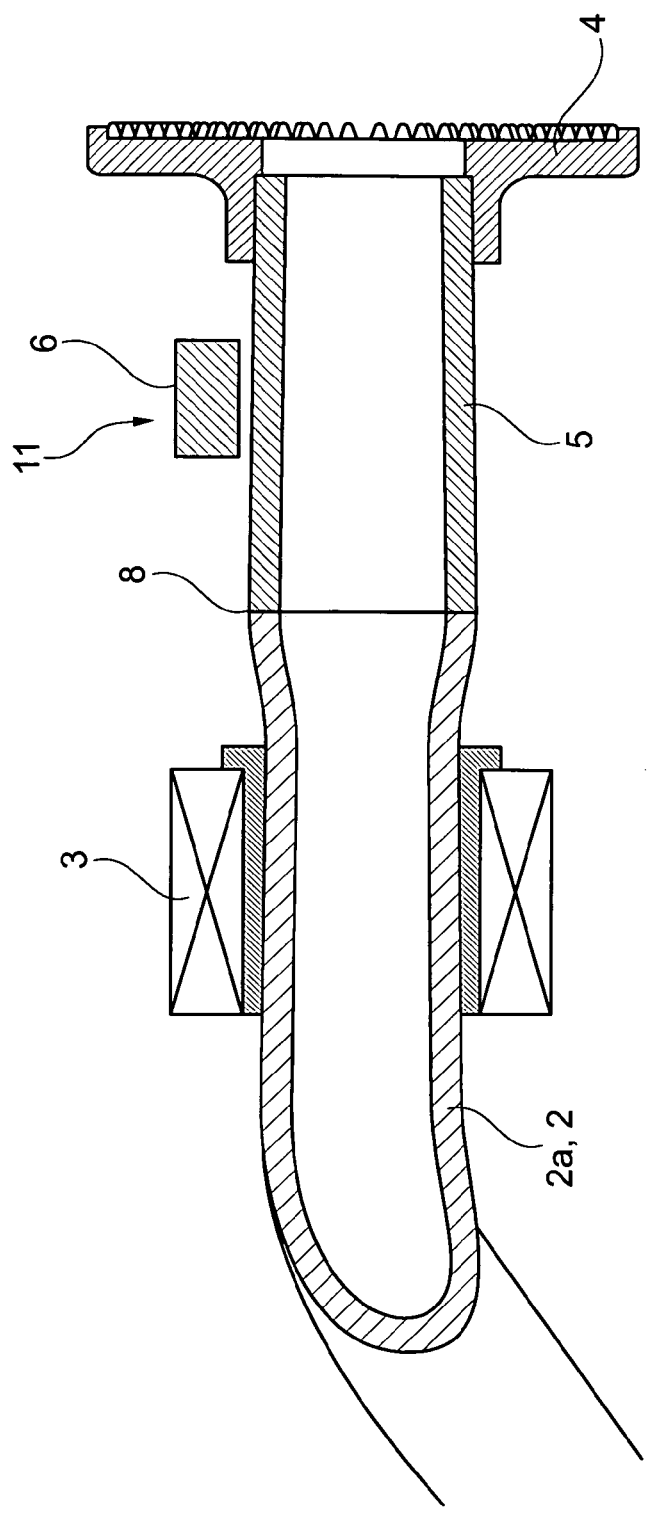
FIG. 2 is an enlarged detail section from FIG. 1.

FIG. 2 shows an enlarged detail from FIG. 1. A sensor 11 for determining the actuator moment is integrated into the torsion bar spring 2. The actuator moment is the torsional moment acting in the stabilizer parts 2a. A contactless torsional moment measurement can be performed directly in the load path of the torsion bar spring 2, wherein at least one part of the torsion bar spring 2 is made from magnetostrictive, magnetically coded steel. This part forms a primary sensor 5. This part can be formed from a tubular piece that is connected on one side with a material fit to the stabilizer part 2a and on the other side rigidly to a flange 4. This primary sensor 5 transmits the full torsional moment of the roll stabilizer.

The flange 4 can also be designated as an attachment part or a connection part that can be locked in rotation, on one side, on the stabilizer part 2a and, on the other side, on the actuator 1. The flange 4 can be screwed onto the actuator 1 with screws; the flange 4 can also be connected with a material fit to the actuator 1. The flange 4 can be connected with a material fit, friction fit, or force fit to the stabilizer part. The attachment part can have a shape that is adapted to the stabilizer part 2a and the connection point of the actuator 1. The flange 4 can be attached to the actuator 1 shown in FIG. 1, in order to transmit torsional moments between the actuator 1 and the connected stabilizer parts 2a.

A secondary sensor 6 is arranged outside of the torsion bar spring in the vicinity of the primary sensor 5 formed by the tubular piece and measures the change in slope of the field lines caused by the torsion of the primary sensor 5. The secondary sensor 6 forms a magnetic field sensor 6a.

The adjustment of the magnetically coded primary sensor 5 to the torsion bar spring can also be realized parallel to the load path as shown in FIGS. 3 to 6. In these refinements according to the invention, the primary sensor does not transmit the full effective torsional moment, but instead only a measurement torsional moment that is dependent on the torsional moment acting in the torsion bar spring.

Figure 3:
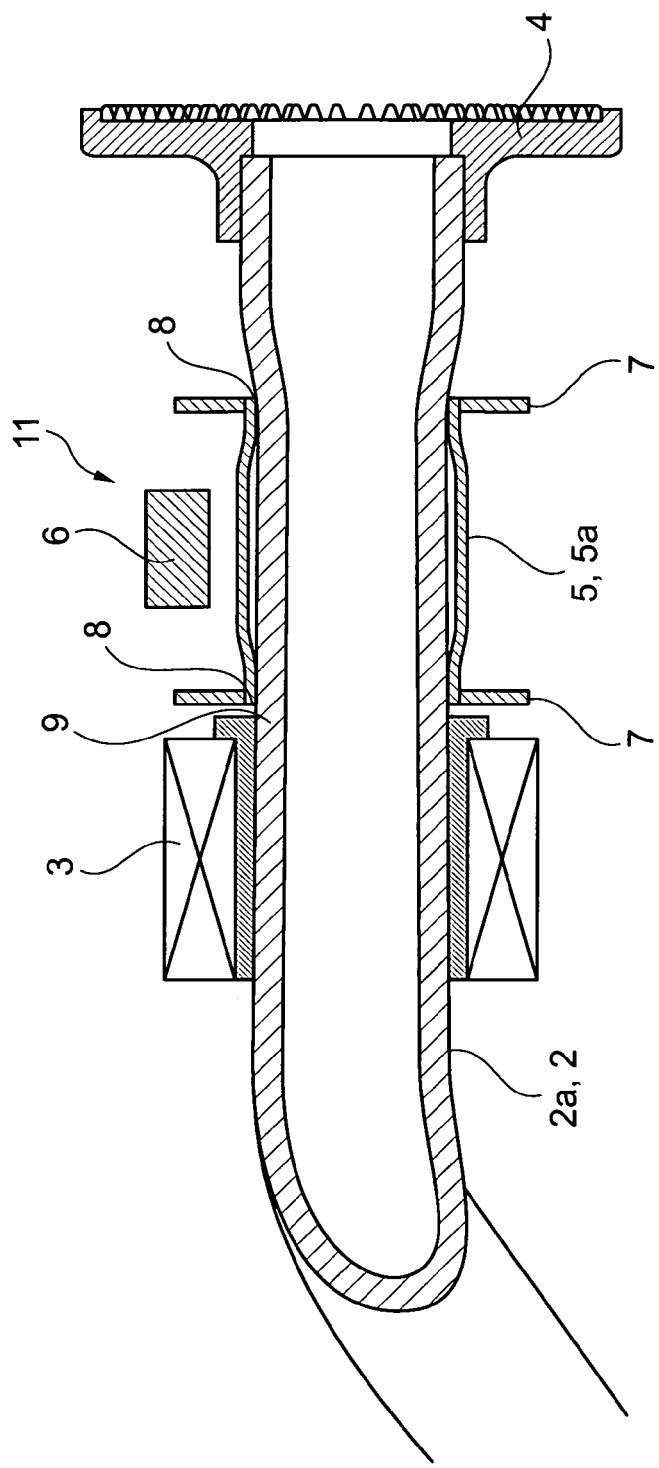
FIG. 3 is a variant according to the invention in an illustration as in FIG. 2.

The split roll stabilizer according to the invention from FIG. 3 differs from the one from FIG. 2 by a modified primary sensor 5. According to FIG. 3, the primary sensor 5 is formed by a sleeve 5a that is attached by means of a fastener formed by a retaining clamp 7 or by material-fit connection 8 directly on the torsion bar spring upper surface 9. The torsion bar spring upper surface 9 is formed by the stabilizer part 2a. From FIG. 3 it can be inferred that the retaining clamp 7 is arranged on both axial ends of the sleeve 5a, so that the axial ends are locked in rotation on the torsion bar spring upper surface 9. FIG. 3 shows two variants how the sleeve 5a can be locked in rotation on the torsion bar spring upper surface: above the longitudinal axis of the tubular stabilizer part 2a there is a material-fit connection of the axial ends of the sleeve 5a to the torsion bar spring upper surface 9. Under the longitudinal axis of the tubular stabilizer part 2a there is the described clamp connection of the axial ends of the sleeve 5a to the torsion bar spring upper surface 9.

Figure 4:
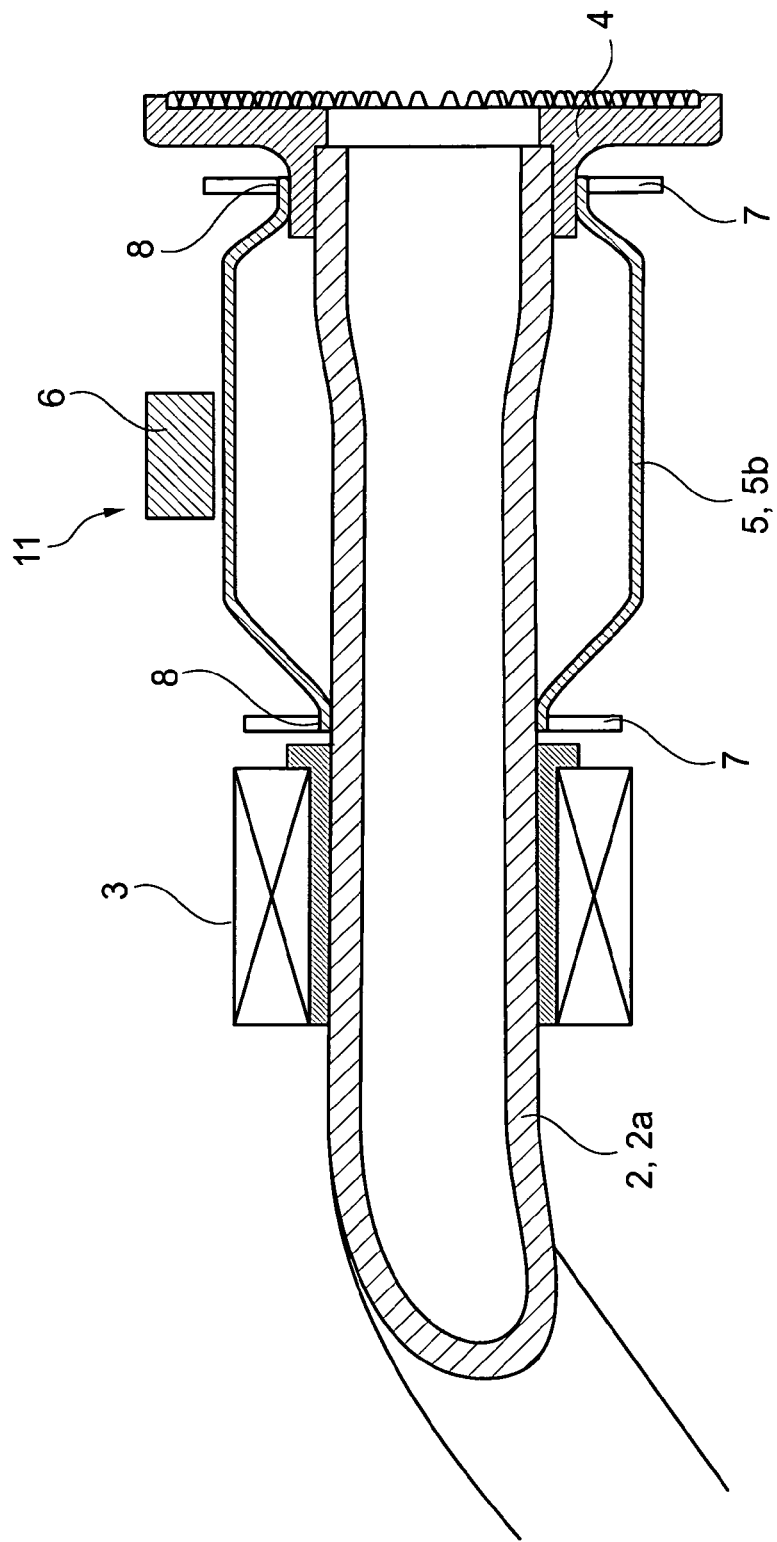
FIG. 4 is another variant according to the invention in an illustration as in FIG. 2.

The split roll stabilizer according to the invention from FIG. 4 differs from the one from FIG. 3 only in that the axial end of the sleeve 5b facing away from the stabilizer bearing 3 is attached by means of the retaining clamp 7 or by the material-fit connection 8 on the cylindrical part of the flange 4. This has the advantage of generating a maximum possible measurement length using minimal installation space. The sleeve 5b according to FIG. 4 is longer relative to the sleeve 5a from FIG. 3, so that a larger rotational angle is generated in the sleeve 5b.

Figure 5:
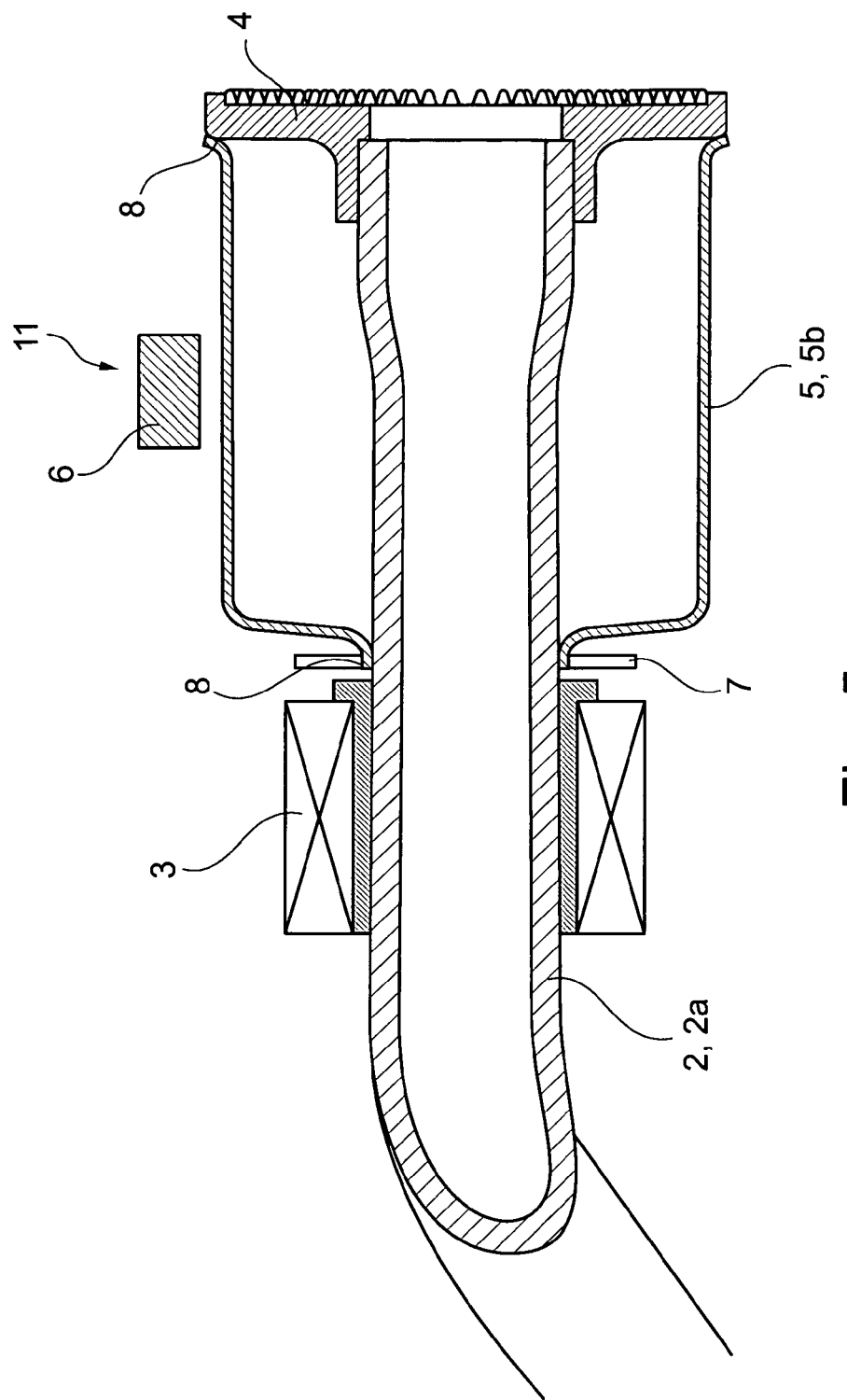
FIG. 5 is another variant according to the invention in an illustration as in FIG. 2.

The split roll stabilizer according to the invention from FIG. 5 differs from the one from FIG. 4 only in that the axial end of the sleeve 5b facing away from the stabilizer bearing 3 is attached by means of the retaining clamp 7 or by the material-fit connection 8 on the outer diameter of the flange 4 or on its planar surface or end surface. This has the advantage of generating the largest possible measurement length between the stabilizer bearing 3 and the flange 4.

Figure 6:
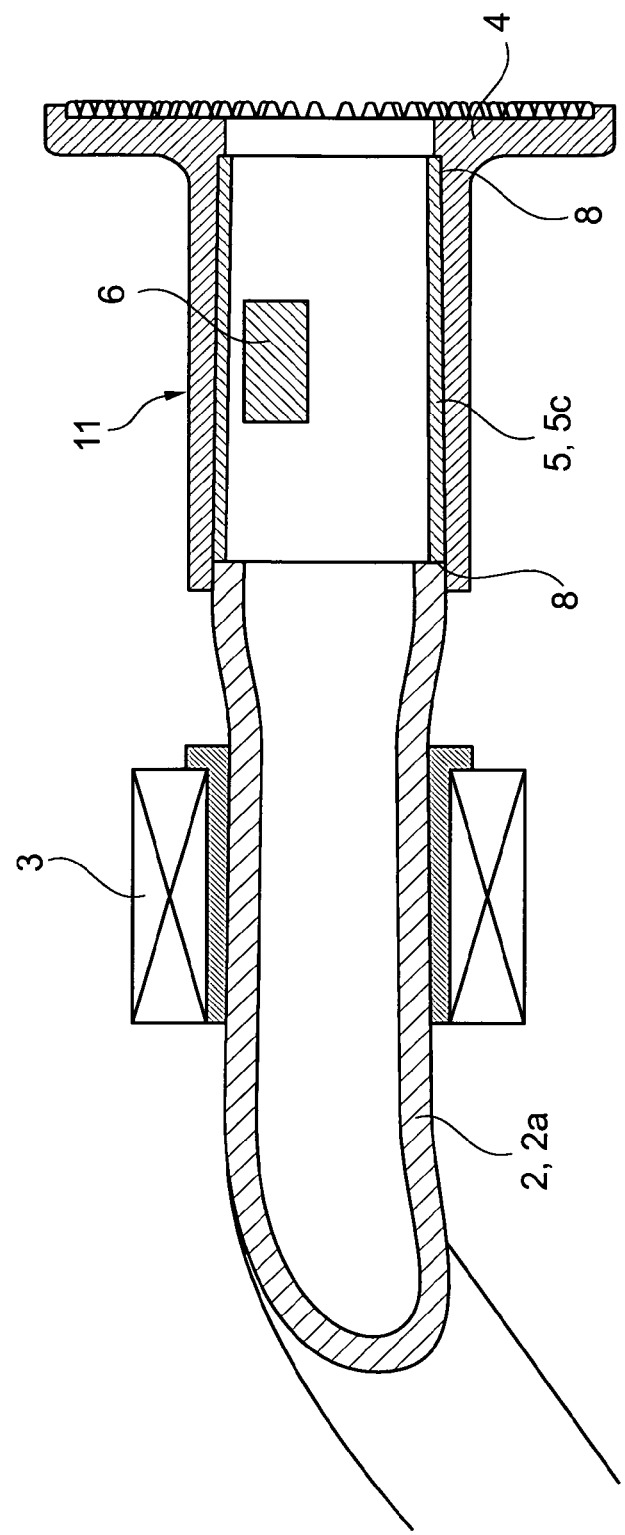
FIG. 6 is another variant according to the invention in an illustration as in FIG. 2.

According to FIG. 6, the adjustment is realized in that a sleeve 5c forming the primary sensor 5 is attached by means of the material-fit connection 8 on the inside in the torsion bar spring 2 between the flange 4 and the torsion bar spring 2. The secondary sensor 6 is arranged radially within the sleeve 5c. The inner arrangement protects both the primary sensor 5 and also the secondary sensor 6 from undesired external effects.

In the variants described here, the sleeves 5a, 5b, 5c are arranged, in other words, locked in rotation with their axial ends, so that the ends of the sleeves are rotated when the stabilizer parts 2a are under torsion.

In roll stabilizers according to the invention, the sensors 11 can be arranged on only one of the two stabilizer parts 2a. It is possible, however, to provide both stabilizer parts each with a sensor 11.

LIST OF REFERENCE NUMBERS

1 Actuator
2 Torsion bar spring
2a Stabilizer part
3 Stabilizer bearing
4 Flange
5 Magnetically coded primary sensor
5a Sleeve
5b Sleeve
5c Sleeve
6 Secondary sensor
6a Magnetic field sensor
7 Retaining clamp
8 Material-fit connection
9 Torsion bar spring upper surface
10
11 Sensor

What is claimed is:

1. A split roll stabilizer of a motor vehicle, comprising two stabilizer parts adapted to receive an actuator actively arranged therebetween for torsion of the stabilizer parts, and a sensor that determines a torsional moment acting in the stabilizer parts, the sensor includes a magnetically coded primary sensor arranged on one of the stabilizer parts, and a magnetic field sensor that converts changes in a magnetic field of the primary sensor into an electrical signal as a secondary sensor, and the primary sensor is formed by a section of the one of the stabilizer parts that is formed from ferromagnetic material and is coded magnetically, and the active torsional moment is introduced into said section.

2. The split roll stabilizer according to claim 1, wherein the one of the stabilizer parts is supported for rotation by a stabilizer bearing, and the primary sensor is arranged between an end of the one of the stabilizer parts facing the actuator and the stabilizer bearing.

3. The split roll stabilizer according to claim 1, wherein both of the stabilizer parts are supported for rotation by stabilizer bearings, and there are two of the primary sensors, with each one of the primary sensors being arranged between an end of the stabilizer parts facing the actuator and the stabilizer bearing.

4. A split roll stabilizer of a motor vehicle, comprising two stabilizer parts adapted to receive an actuator actively arranged therebetween for torsion of the stabilizer parts, and a sensor that determines a torsional moment acting in the stabilizer parts, the sensor includes a magnetically coded primary sensor arranged on one of the stabilizer parts, and a magnetic field sensor that converts changes in a magnetic field of the primary sensor into an electrical signal as a secondary sensor, and the primary sensor is connected parallel to the one of the stabilizer parts for detecting a measurement torque, and the measurement torque is dependent on a torsion of the stabilizer part.

5. The split roll stabilizer according to claim 4, wherein the primary sensor is formed by a sleeve arranged on the one of the stabilizer parts.

6. The split roll stabilizer according to claim 5, wherein an end of the one of the stabilizer parts facing the actuator is locked in rotation with a flange connected to the actuator, and the sleeve is locked in rotation at one end with the flange and at the other end with the stabilizer part.

* * * * *